US011400915B2

(12) United States Patent
Kucharski et al.

(10) Patent No.: US 11,400,915 B2
(45) Date of Patent: Aug. 2, 2022

(54) METHODS AND SYSTEM FOR STARTING AN ENGINE

(71) Applicant: Ford Global Technologies, LLC, Dearborn, MI (US)

(72) Inventors: Joseph Kucharski, Livonia, MI (US); Peter Keller, Dearborn, MI (US); Andrew E. Burt, Royal Oak, MI (US); Minku Lee, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 774 days.

(21) Appl. No.: 16/165,690

(22) Filed: Oct. 19, 2018

(65) Prior Publication Data

US 2020/0122708 A1    Apr. 23, 2020

(51) Int. Cl.
*B60W 20/10* (2016.01)
*F02N 11/08* (2006.01)
(Continued)

(52) U.S. Cl.
CPC ............... *B60W 20/10* (2013.01); *B60K 6/26* (2013.01); *B60K 6/387* (2013.01); *B60K 6/48* (2013.01); *B60W 10/02* (2013.01); *B60W 10/026* (2013.01); *B60W 10/06* (2013.01); *B60W 10/08* (2013.01); *B60W 20/40* (2013.01); *B60W 30/192* (2013.01); *F02N 11/0803* (2013.01); *F16H 61/143* (2013.01); *B60K 2006/268* (2013.01); *B60K 2006/4833* (2013.01); *B60W 2510/0241* (2013.01); *B60W 2510/06* (2013.01); *B60W 2710/025* (2013.01);
(Continued)

(58) Field of Classification Search
CPC .... B60W 20/10; B60W 10/02; B60W 10/026; B60W 10/06; B60W 10/08; B60W 20/40; B60W 30/192; B60W 2510/0241; B60W 2510/06; B60W 2710/025; B60W 2710/06; B60W 2710/081; B60W 2710/083; B60W 50/00; B60W 2050/0043; B60W 2710/021; B60W 2710/0666; B60K 6/26; B60K 6/387; B60K 6/48; B60K 2006/268; B60K 2006/4833; B60K 2006/4825; F02N 11/0803; F02N 11/04; F02N 2200/061; F02N 2300/102; F02N 2300/104; F02N 2300/2011; F02N 11/0851; F16H 61/143; F16H 2061/145; F16H 2312/14; B60Y 2200/92; B60Y 2300/192; B60Y 2400/426; B60Y 2400/47; Y02T 10/62
See application file for complete search history.

(56) References Cited

U.S. PATENT DOCUMENTS 9,327,721 B2    5/2016  Johri et al.
2016/0297418 A1 * 10/2016  Zhang ...................... B60K 6/48
(Continued)

*Primary Examiner* — David J Hlavka
(74) *Attorney, Agent, or Firm* — David Kelley; McCoy Russell LLP

(57) ABSTRACT

Systems and methods for starting an engine that is incorporated into a hybrid vehicle driveline are described. In one example, a torque converter clutch is fully opened if a threshold amount has transpired after a request for torque converter clutch slip is requested but not delivered. Further, the torque converter clutch may be fully opened if a commanded torque converter clutch torque capacity is less than a threshold torque capacity.

20 Claims, 5 Drawing Sheets

(51) Int. Cl.
  *B60K 6/387* (2007.10)
  *F16H 61/14* (2006.01)
  *B60W 10/02* (2006.01)
  *B60W 10/08* (2006.01)
  *B60W 30/192* (2012.01)
  *B60K 6/26* (2007.10)
  *B60K 6/48* (2007.10)
  *B60W 20/40* (2016.01)
  *B60W 10/06* (2006.01)
  *F02N 11/04* (2006.01)

(52) U.S. Cl.
  CPC ... *B60W 2710/06* (2013.01); *B60W 2710/081* (2013.01); *B60W 2710/083* (2013.01); *B60Y 2200/92* (2013.01); *B60Y 2300/192* (2013.01); *B60Y 2400/426* (2013.01); *B60Y 2400/47* (2013.01); *F02N 11/04* (2013.01); *F16H 2061/145* (2013.01)

(56) References Cited

U.S. PATENT DOCUMENTS

2016/0297419 A1* 10/2016 Zhang .................. B60W 20/19
2018/0050687 A1   2/2018 Meyer et al.
2019/0219163 A1*  7/2019 Meyer .................... F16D 48/02

* cited by examiner

METHODS AND SYSTEM FOR STARTING AN ENGINE

FIELD

The present description relates to methods and a system for starting an engine of a vehicle that includes a torque converter and a driveline disconnect clutch.

BACKGROUND AND SUMMARY

A driveline of a vehicle may include an electric machine, an engine, a driveline disconnect clutch, and a transmission with a torque converter clutch. The driveline may provide propulsive force to vehicle wheels solely via the electric machine at lower driver demand torque levels. If the driver demand torque is greater than a threshold torque, then the engine may be started via closing the driveline disconnect clutch and accelerating the engine via the electric machine. For many driving conditions it may be desirable to operate with the torque converter clutch fully closed (e.g., locked) so that there is no speed difference across the torque converter clutch. However, when the engine is being started, it may be desirable to provide slip across the torque converter clutch so that driveline torque disturbances that may be related to engine starting may be mitigated. Nevertheless, the torque converter clutch may not exhibit slip during some conditions where torque output from the integrated starter/generator is low because of torque converter clutch torque capacity variations that may be related to torque converter clutch stroke pressure and a torque converter clutch margin pressure. Therefore, it may be desirable to provide a way of reducing driveline noise and vibration during engine starting even if torque capacity of a torque converter clutch may be different than a commanded torque converter clutch torque capacity.

The inventors herein have recognized the above-mentioned issues and have developed an a driveline operating method, comprising: requesting an engine start; and requesting slip of a torque converter clutch in response to the request to start the engine; and fully opening a torque converter clutch via a controller after a threshold amount of time has passed since the requesting slip of the torque converter clutch when slip of the torque converter clutch is not present.

By fully opening the torque converter clutch after a threshold amount of time has passed since the requesting of slip of the torque converter clutch when slip of the torque converter clutch is not present, it may be possible to provide the technical result of reduced driveline noise and vibration even in instances where a torque capacity of a torque converter clutch is different from a commanded torque capacity of the torque converter clutch. A fully open torque converter clutch allows transfer of engine and electric machine torque through a hydraulic torque path in the torque converter. Further, a fully open torque converter clutch prevents engine and electric machine torque flow through a mechanical path (e.g., the torque converter clutch) in the torque converter to reduce driveline noise and vibration. The control action of fully opening the torque converter clutch may also be applied to compensate for conditions when the torque capacity of a torque converter clutch exceeds a commanded torque capacity of the torque converter clutch to reduce driveline noise and vibration.

The present description may provide several advantages. In particular, the approach may reduce driveline noise and vibration. Further, the approach may open a torque converter clutch according to two different conditions so that the possibility of transferring large torque disturbances through a mechanical torque transfer path in a torque converter may be reduced. Further still, the approach may provide for lower driveline losses when a torque converter clutch torque capacity is close to a commanded torque converter clutch torque capacity.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

The present description is related to operating a torque converter clutch and starting an engine. The engine may be of the type shown in FIG. 1. The engine may be part of a powertrain that includes an integrated starter/generator (ISG) as is shown in FIG. 2. The engine may be started via torque provided by the ISG and by closing a driveline disconnect clutch that is positioned between the engine and the ISG. During engine starting, a torque converter clutch may be controlled via the method of FIG. 5 and the block diagram of FIG. 3 to reduce driveline noise. An example vehicle operating sequence is shown in FIG. 4. The vehicle operating sequence of FIG. 4 is performed according to the method of FIG. 5.

Figure 1:
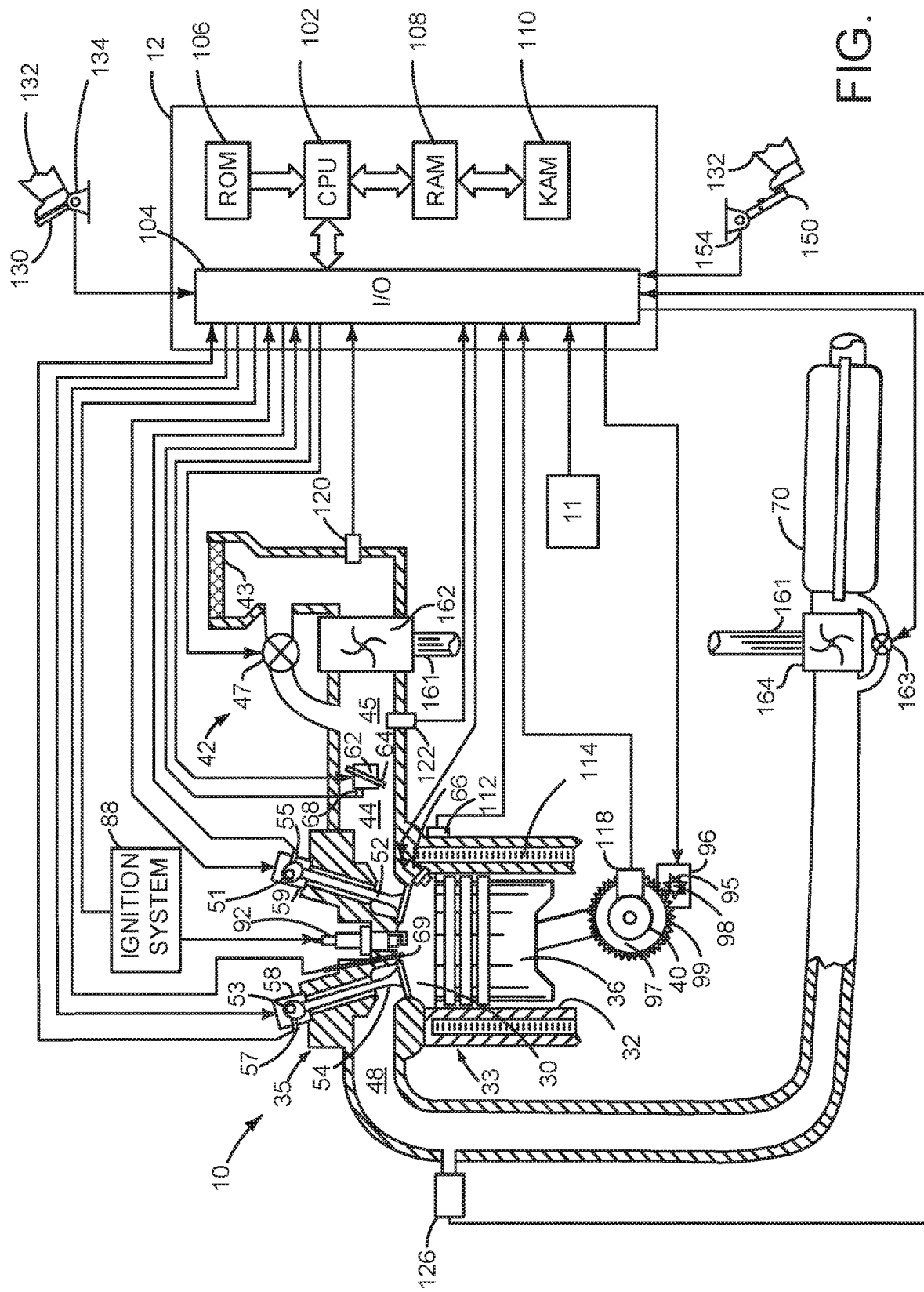
FIG. 1 is a schematic diagram of an engine.
Figure 2:
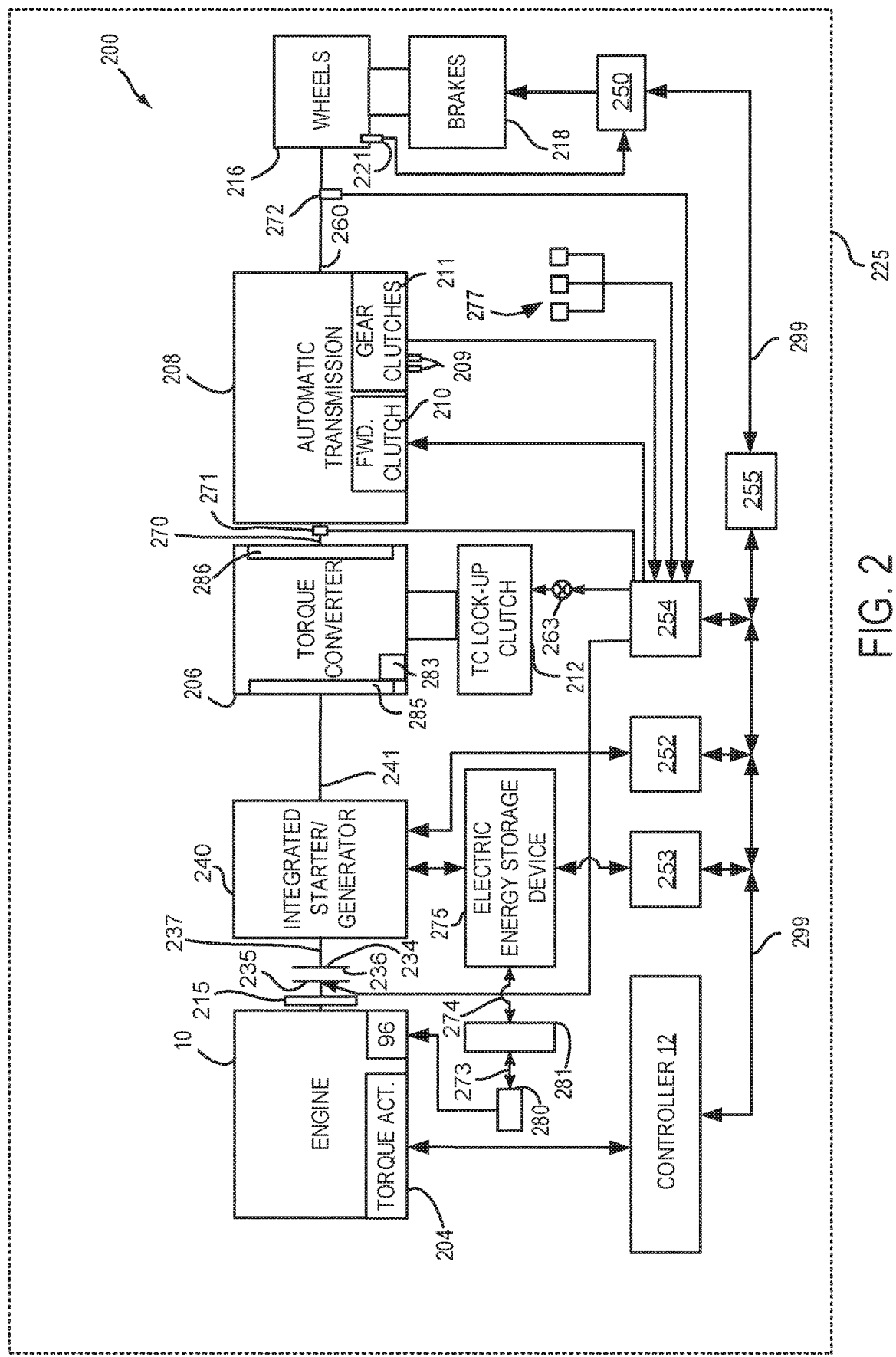
FIG. 2 is a schematic diagram of a hybrid vehicle driveline.

Referring to FIG. 1, internal combustion engine 10, comprising one or more cylinders, one cylinder of which is shown in FIG. 1, is controlled by electronic engine controller 12. The controller 12 receives signals from the various sensors shown in FIGS. 1 and 2. Controller 12 employs the actuators shown in FIGS. 1 and 2 to adjust engine operation based on the received signals and instructions stored in memory of controller 12.

Engine 10 is comprised of cylinder head 35 and block 33, which include combustion chamber 30 and cylinder walls 32. Piston 36 is positioned therein and reciprocates via a connection to crankshaft 40. Flywheel 97 and ring gear 99 are coupled to crankshaft 40. Optional starter 96 (e.g., low voltage (operated with less than 30 volts) electric machine)

includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft.

Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake valve 52 may be selectively activated and deactivated by valve activation device 59. Exhaust valve 54 may be selectively activated and deactivated by valve activation device 58. Valve activation devices 58 and 59 may be electro-mechanical devices. Pressure in combustion chamber 30 may be sensed via cylinder pressure sensor 69.

Fuel injector 66 is shown positioned to inject fuel directly into cylinder 30, which is known to those skilled in the art as direct injection. Fuel injector 66 delivers liquid fuel in proportion to the pulse width from controller 12. Fuel is delivered to fuel injector 66 by a fuel system (not shown) including a fuel tank, fuel pump, and fuel rail (not shown). In one example, a high pressure, dual stage, fuel system may be used to generate higher fuel pressures.

In addition, intake manifold 44 is shown communicating with turbocharger compressor 162 and engine air intake 42. In other examples, compressor 162 may be a supercharger compressor. Shaft 161 mechanically couples turbocharger turbine 164 to turbocharger compressor 162. Optional electronic throttle 62 adjusts a position of throttle plate 64 to control air flow from compressor 162 to intake manifold 44. Pressure in boost chamber 45 may be referred to a throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Compressor recirculation valve 47 may be selectively adjusted to a plurality of positions between fully open and fully closed. Wastegate 163 may be adjusted via controller 12 to allow exhaust gases to selectively bypass turbine 164 to control the speed of compressor 162. Air filter 43 cleans air entering engine air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by human driver 132; a position sensor 154 coupled to brake pedal 150 for sensing force applied by human driver 132, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 68. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

Controller 12 may also receive input from human/machine interface 11. A request to start or stop the engine or vehicle may be generated via a human and input to the human/machine interface 11. Further, the vehicle may be activated (e.g., systems are activated and prepared to supply energy to vehicle propulsion sources such as internal combustion engines and electric machines) via human/machine interface 11. Activating the vehicle may include increasing pressure of fuel supplied to an engine and supplying electrical power to an inverter. The human/machine interface may be a touch screen display, pushbutton, key switch or other known device.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle 225 including a powertrain or driveline 200. The powertrain of FIG. 2 includes engine 10 shown in FIG. 1. Powertrain 200 is shown including vehicle system controller 255, engine controller 12, electric machine controller 252, transmission controller 254, energy storage device controller 253, and brake controller 250. The controllers may communicate over controller area network (CAN) 299. Each of the controllers may provide information to other controllers such as torque output limits (e.g., torque output of the device or component being controlled not to be exceeded), torque input limits (e.g., torque input of the device or component being controlled not to be exceeded), torque output of the device being controlled, sensor and actuator data, diagnostic information (e.g., information regarding a degraded transmission, information regarding a degraded engine, information regarding a degraded electric machine, information regarding degraded brakes). Further, the vehicle system controller 255 may provide commands to engine controller 12, electric machine controller 252, transmission controller 254, and brake controller 250 to achieve driver input requests and other requests that are based on vehicle operating conditions.

For example, in response to a driver releasing an accelerator pedal and vehicle speed, vehicle system controller 255 may request a desired wheel torque or a wheel power level to provide a desired rate of vehicle deceleration. The desired wheel torque may be provided by vehicle system controller 255 requesting a first braking torque from electric machine controller 252 and a second braking torque from brake controller 250, the first and second torques providing the desired braking torque at vehicle wheels 216.

In other examples, the partitioning of powertrain controlling devices may be different than that shown in FIG. 2. For example, a single controller may take the place of vehicle system controller 255, engine controller 12, electric machine controller 252, transmission controller 254, and brake controller 250. Alternatively, the vehicle system controller 255 and the engine controller 12 may be a single unit while the electric machine controller 252, the transmission controller 254, and the brake controller 250 are standalone controllers.

In this example, powertrain 200 may be powered by engine 10 and electric machine 240. In other examples, engine 10 may be omitted. Engine 10 may be started with an engine starting system shown in FIG. 1 or via driveline integrated starter/generator (ISG) 240 also known as an integrated starter/generator. Driveline ISG 240 (e.g., high voltage (operated with greater than 30 volts) electrical machine) may also be referred to as an electric machine, motor, and/or generator. Further, torque of engine 10 may be adjusted via torque actuator 204, such as a fuel injector, throttle, etc.

Bi-directional DC/DC converter 281 may transfer electrical energy from a high voltage buss 274 to a low voltage buss 273 or vice-versa. Low voltage battery 280 is electrically coupled to low voltage buss 273. Electric energy storage device 275 is electrically coupled to high voltage buss 274. Low voltage battery 280 selectively supplies electrical energy to starter motor 96.

An engine output torque may be transmitted to an input or first side of powertrain disconnect clutch 235 through dual mass flywheel 215. Disconnect clutch 236 may be electrically or hydraulically actuated. The downstream or second side 234 of disconnect clutch 236 is shown mechanically coupled to ISG input shaft 237.

ISG 240 may be operated to provide torque to powertrain 200 or to convert powertrain torque into electrical energy to be stored in electric energy storage device 275 in a regeneration mode. ISG 240 is in electrical communication with energy storage device 275. ISG 240 has a higher output torque capacity than starter 96 shown in FIG. 1. Further, ISG 240 directly drives powertrain 200 or is directly driven by powertrain 200. There are no belts, gears, or chains to couple ISG 240 to powertrain 200. Rather, ISG 240 rotates at the same rate as powertrain 200. Electrical energy storage device 275 (e.g., high voltage battery or power source) may be a battery, capacitor, or inductor. The downstream side of ISG 240 is mechanically coupled to the impeller 285 of torque converter 206 via shaft 241. The upstream side of the ISG 240 is mechanically coupled to the disconnect clutch 236. ISG 240 may provide a positive torque or a negative torque to powertrain 200 via operating as a motor or generator as instructed by electric machine controller 252.

Torque converter 206 includes a turbine 286 to output torque to input shaft 270. Input shaft 270 mechanically couples torque converter 206 to automatic transmission 208. Torque converter 206 also includes a torque converter bypass lock-up clutch 212 (TCC). Torque is directly transferred from impeller 285 to turbine 286 when TCC is locked. TCC is electrically operated by controller 12. Alternatively, TCC may be hydraulically locked. In one example, the torque converter may be referred to as a component of the transmission.

When torque converter lock-up clutch 212 is fully disengaged, torque converter 206 transmits engine torque to automatic transmission 208 via fluid transfer between the torque converter turbine 286 and torque converter impeller 285, thereby enabling torque multiplication. In contrast, when torque converter lock-up clutch 212 is fully engaged, the engine output torque is directly transferred via the torque converter clutch to an input shaft 270 of transmission 208. Alternatively, the torque converter lock-up clutch 212 may be partially engaged, thereby enabling the amount of torque directly relayed to the transmission to be adjusted. The transmission controller 254 may be configured to adjust the amount of torque transmitted by torque converter 212 by adjusting the torque converter lock-up clutch in response to various engine operating conditions, or based on a driver-based engine operation request. Transmission controller 254 may supply a signal to solenoid or actuator 263 to adjust a pressure that is applied to close torque converter clutch 212 via transmission fluid.

Torque converter 206 also includes pump 283 that pressurizes fluid to operate disconnect clutch 236, torque converter clutch 212, forward clutch 210, and gear clutches 211. Pump 283 is driven via impeller 285, which rotates at a same speed as ISG 240.

Automatic transmission 208 includes gear clutches (e.g., gears 1-10) 211 and forward clutch 210. Automatic transmission 208 is a fixed ratio transmission. The gear clutches 211 and the forward clutch 210 may be selectively engaged to change a ratio of an actual total number of turns of input shaft 270 to an actual total number of turns of wheels 216. Gear clutches 211 may be engaged or disengaged via adjusting fluid supplied to the clutches via shift control solenoid valves 209. Torque output from the automatic transmission 208 may also be relayed to wheels 216 to propel the vehicle via output shaft 260. Specifically, automatic transmission 208 may transfer an input driving torque at the input shaft 270 responsive to a vehicle traveling condition before transmitting an output driving torque to the wheels 216. Transmission controller 254 selectively activates or engages TCC 212, gear clutches 211, and forward clutch 210. Transmission controller also selectively deactivates or disengages TCC 212, gear clutches 211, and forward clutch 210.

Further, a frictional force may be applied to wheels 216 by engaging friction wheel brakes 218. In one example, friction wheel brakes 218 may be engaged in response to the driver pressing his foot on a brake pedal (not shown) and/or in response to instructions within brake controller 250. Further, brake controller 250 may apply brakes 218 in response to information and/or requests made by vehicle system controller 255. In the same way, a frictional force may be reduced to wheels 216 by disengaging wheel brakes 218 in response to the driver releasing his foot from a brake pedal, brake controller instructions, and/or vehicle system controller instructions and/or information. For example, vehicle brakes may apply a frictional force to wheels 216 via controller 250 as part of an automated engine stopping procedure.

In response to a request to accelerate vehicle 225, vehicle system controller may obtain a driver demand torque or power request from an accelerator pedal or other device. Vehicle system controller 255 then allocates a fraction of the requested driver demand torque to the engine and the remaining fraction to the ISG or BISG. Vehicle system controller 255 requests the engine torque from engine controller 12 and the ISG torque from electric machine controller 252. If the ISG torque plus the engine torque is less than a transmission input torque limit (e.g., a threshold value not to be exceeded), the torque is delivered to torque converter 206 which then relays at least a fraction of the requested torque to transmission input shaft 270. Transmission controller 254 selectively locks torque converter clutch 212 and engages gears via gear clutches 211 in response to shift schedules and TCC lockup schedules that may be based on input shaft torque and vehicle speed. In some conditions when it may be desired to charge electric energy storage device 275, a charging torque (e.g., a negative ISG torque) may be requested while a non-zero driver demand torque is present. Vehicle system controller 255 may request increased engine torque to overcome the charging torque to meet the driver demand torque.

In response to a request to decelerate vehicle 225 and provide regenerative braking, vehicle system controller may provide a negative desired wheel torque based on vehicle speed and brake pedal position. Vehicle system controller 255 then allocates a fraction of the negative desired wheel torque to the ISG 240 (e.g., desired powertrain wheel torque) and the remaining fraction to friction brakes 218 (e.g., desired friction brake wheel torque). Further, vehicle system controller may notify transmission controller 254 that the vehicle is in regenerative braking mode so that transmission controller 254 shifts gears 211 based on a unique shifting schedule to increase regeneration efficiency. ISG 240 supplies a negative torque to transmission input shaft 270, but negative torque provided by ISG 240 may be limited by transmission controller 254 which outputs a transmission input shaft negative torque limit (e.g., not to be exceeded threshold value). Further, negative torque of ISG 240 may be limited (e.g., constrained to less than a threshold negative threshold torque) based on operating conditions of electric energy storage device 275, by vehicle system controller 255, or electric machine controller 252. Any portion of desired negative wheel torque that may not be provided by ISG 240 because of transmission or ISG limits may be allocated to friction brakes 218 so that the desired wheel torque is provided by a combination of negative wheel torque from friction brakes 218 and ISG 240.

Accordingly, torque control of the various powertrain components may be supervised by vehicle system controller 255 with local torque control for the engine 10, transmission 208, electric machine 240, and brakes 218 provided via engine controller 12, electric machine controller 252, transmission controller 254, and brake controller 250.

As one example, an engine torque output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output.

Electric machine controller 252 may control torque output and electrical energy production from ISG 240 by adjusting current flowing to and from field and/or armature windings of ISG as is known in the art.

Transmission controller 254 receives transmission input shaft position via position sensor 271. Transmission controller 254 may convert transmission input shaft position into input shaft speed via differentiating a signal from position sensor 271 or counting a number of known angular distance pulses over a predetermined time interval. Transmission controller 254 may receive transmission output shaft torque from torque sensor 272. Alternatively, sensor 272 may be a position sensor or torque and position sensors. If sensor 272 is a position sensor, controller 254 may count shaft position pulses over a predetermined time interval to determine transmission output shaft velocity. Transmission controller 254 may also differentiate transmission output shaft velocity to determine transmission output shaft acceleration. Transmission controller 254, engine controller 12, and vehicle system controller 255, may also receive addition transmission information from sensors 277, which may include but are not limited to pump output line pressure sensors, transmission hydraulic pressure sensors (e.g., gear clutch fluid pressure sensors), ISG temperature sensors, and BISG temperatures, and ambient temperature sensors.

Brake controller 250 receives wheel speed information via wheel speed sensor 221 and braking requests from vehicle system controller 255. Brake controller 250 may also receive brake pedal position information from brake pedal sensor 154 shown in FIG. 1 directly or over CAN 299. Brake controller 250 may provide braking responsive to a wheel torque command from vehicle system controller 255. Brake controller 250 may also provide anti-lock and vehicle stability braking to improve vehicle braking and stability. As such, brake controller 250 may provide a wheel torque limit (e.g., a threshold negative wheel torque not to be exceeded) to the vehicle system controller 255 so that negative ISG torque does not cause the wheel torque limit to be exceeded. For example, if controller 250 issues a negative wheel torque limit of 50 N-m, ISG torque is adjusted to provide less than 50 N-m (e.g., 49 N-m) of negative torque at the wheels, including accounting for transmission gearing.

Thus, the system of FIGS. 1 and 2 provides for a system, comprising: an engine; an electric machine; a driveline disconnect clutch; a torque converter including a torque converter clutch; and a controller including executable instructions stored in non-transitory memory to fully open the torque converter clutch, rotate the engine via torque provided via the electric machine, and closing the driveline disconnect clutch in response to a threshold amount of time having passed since requesting slip of the torque converter clutch in response to an engine start request when slip of the torque converter clutch is not present. The system further comprises additional instructions to fully open the torque converter clutch via the controller after commanding torque converter clutch torque capacity to be reduced to less than a threshold torque capacity after requesting slip of the torque converter clutch when slip of the torque converter clutch is not present. The system further comprises additional instructions to detect slip of the torque converter clutch and change an operating mode of the electric machine from a torque control mode to a speed control mode in response to detecting slip of the torque converter clutch. The system includes where the electric machine is an integrated starter/generator. The system includes where the torque converter clutch is opened unconditionally after the threshold amount of time has passed. The system further comprises additional instructions to start the engine in response to fully opening the torque converter clutch.

Figure 3:
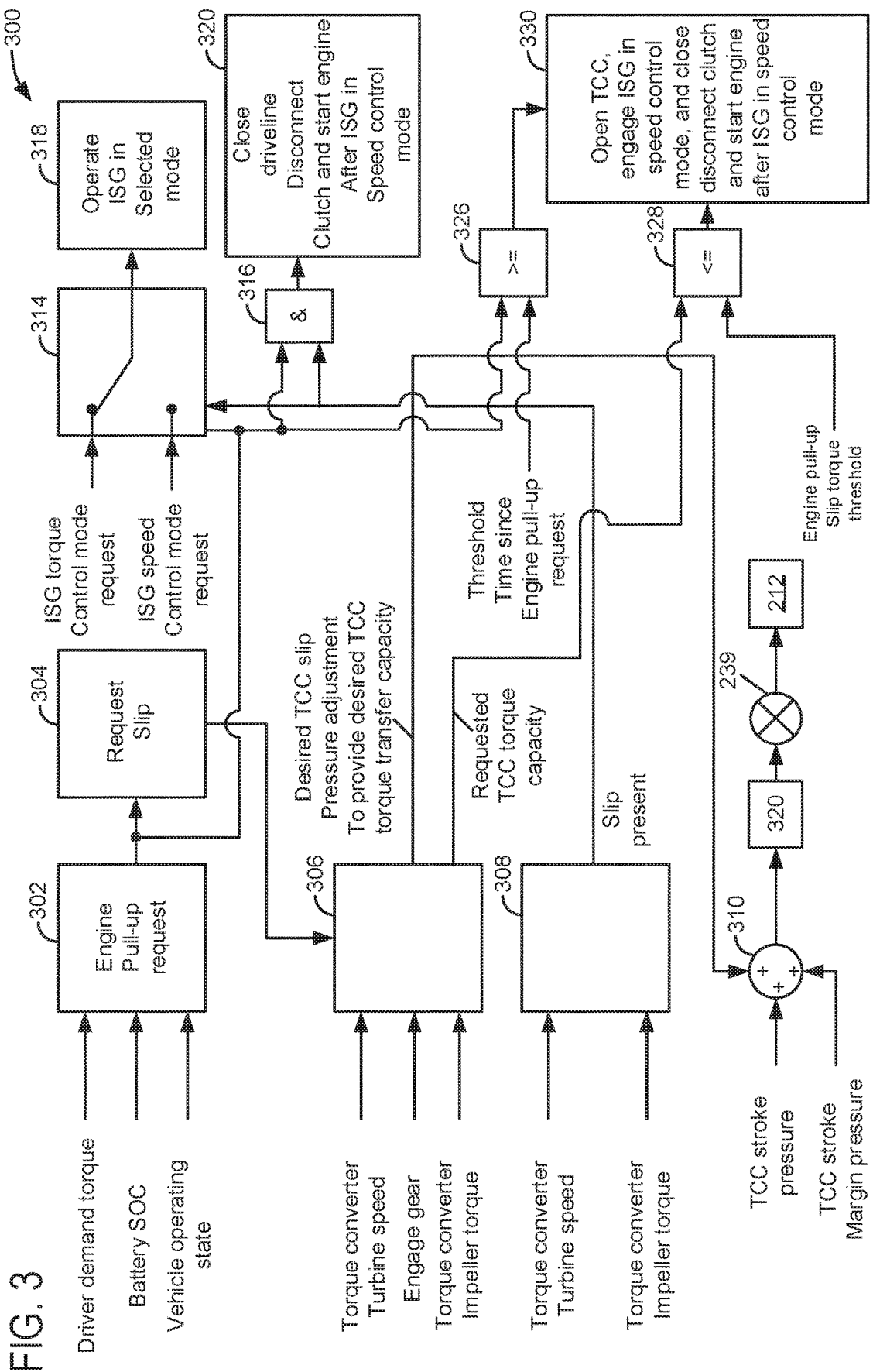
FIG. 3 shows an example block diagram for controlling a torque converter clutch.
Figure 4:
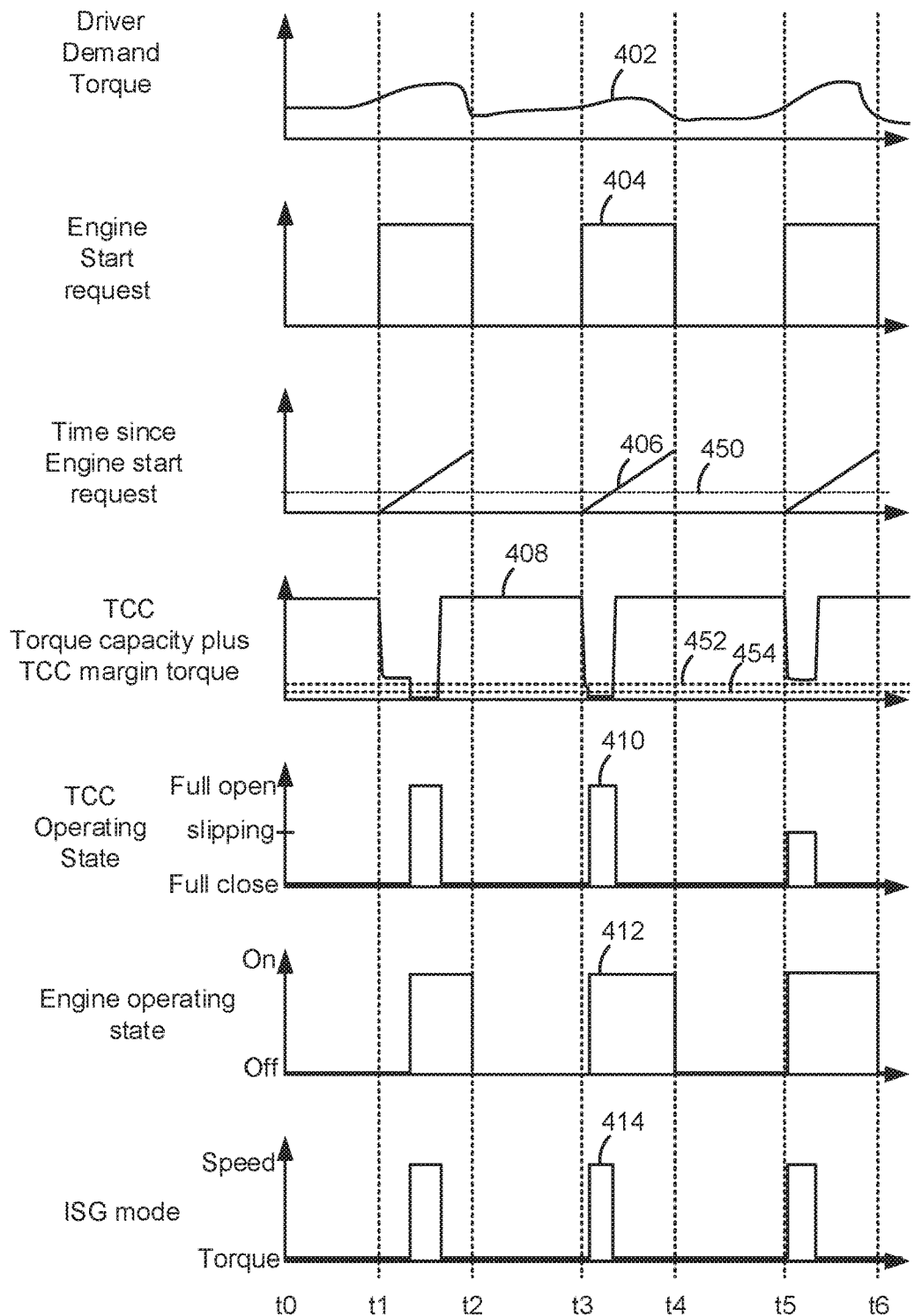
FIG. 4 shows an example driveline operating sequence according to the method of FIG. 5 and the block diagram of FIG. 3.

Referring now to FIG. 3, a block diagram 300 for controlling a vehicle driveline is shown. The block diagram describes a portion of a control system for operating a driveline. The features and operations described herein may be incorporated into one or more controllers as executable instructions stored in non-transitory memory.

At block 302, driver demand torque, battery state of charge (SOC), and vehicle operating state (e.g., vehicle activated/vehicle not activated) are a basis for judging whether or not an engine start is requested (e.g., an engine pull-up). In one example, an engine start may be requested when driver demand torque is greater than a threshold torque. Further, an engine start request may be made when SOC is less than a threshold irrespective of driver demand torque. A request to start the engine may be input to block 304, block 314, and block 326. If an engine start or pull-up is requested, block 304 outputs a torque converter clutch slip request. The torque converter clutch slip request does not specify the amount of torque converter clutch slip. Rather, it simply requests that slip (e.g. a speed difference between a first side of a torque converter clutch (input side) and a second side of the torque converter clutch (output side)) be present. Torque converter clutch slip is requested to allow some compliance in the driveline to reduce driveline noise and vibration during engine starting. In addition, operating the torque converter clutch with some slip may reduce the possibility of the ISG speed controller working against the torque converter clutch controller. Further, the ISG may enter a speed control mode where ISG speed follows a desired speed (constant or varying) and ISG torque is adjusted so that ISG speed follows the desired speed so that vehicle speed may be maintained while ISG torque may be increased to start the engine. The torque converter clutch slip request is input to block 306.

At block 306, a requested torque converter clutch torque capacity (e.g., a threshold amount of torque (e.g., a maximum amount of torque) the torque converter clutch may transfer) is determined. Further, a desired torque converter clutch (TCC) slip amount is determined and the desired torque converter slip amount is converted into a pressure request for the torque converter clutch.

Torque converter clutch turbine speed, the engaged transmission gear, and the torque converter impeller torque are input to block 306 where they are applied to reference or index a table or function that outputs the desired amount of TCC slip. The desired amount of TCC slip may be empirically determined via slipping the TCC at various levels before and during an engine start via the ISG. The slip amount is then converted into an apply pressure for the TCC that is determined via indexing or referencing a second table or function via the requested slip amount. The requested apply pressure for the TCC is input to summing junction 310. Block 306 also outputs a requested torque capacity for the torque converter clutch that may be determined via indexing a referencing a table or function that outputs requested TCC torque capacity as a function of TCC slip. The requested TCC torque capacity is input to block 328.

Block 308 determines whether or not slip is present across the TCC. In one example, block 308 determines an actual TCC slip amount by subtracting the TCC turbine speed from the TCC impeller speed. The slip amount is has units of revolutions per minute. If the slip amount is greater than a threshold (e.g., 40 RPM), then block 308 indicates that TCC slip is present. Otherwise, if the TCC slip amount is less than the threshold, then block 308 indicates that TCC slip is not present. Block 308 is input to block 314 and block 316.

A TCC stroke pressure and a TCC margin pressure are input to summing junction 310. The TCC stroke pressure is a maximum pressure applied to the TCC at which the TCC does not transfer torque. By applying the stroke pressure to the TCC, the TCC may be pre-positioned so that it does not have to move as far if the TCC torque capacity is subsequently increased above zero to being transferring torque across the TCC. The stroke pressure may be a predetermined value that may be updated from time to time. The TCC margin pressure is a pressure increase above the stroke pressure that defines a minimum pressure to apply to the TCC when the TCC is slipping or being requested to slip. The TCC margin pressure may be empirically determined based on an amount of slip that transfers torque across the TCC and it may help to reduce TCC wear. The TCC margin pressure and stroke pressure are added to the pressure adjustment for providing a desired amount of TCC slip at summing junction 310. Summing junction 310 outputs a TCC apply pressure that is converted to a signal duty cycle or signal value for controlling a valve or actuator that adjusts the TCC apply pressure at block 320. The signal output from block 320 is provided to the TCC pressure control valve or actuator 239. The TCC pressure control valve or actuator 239 adjusts the force applied to close the TCC clutch 212.

At block 328, it is judged if a requested TCC torque capacity is less than an engine pull-up TCC slip torque threshold. The TCC slip torque threshold is greater than the TCC torque capacity produce by the TCC stroke pressure and the TCC margin pressure. The TCC slip torque threshold is input to block 328. If TCC torque capacity falls below the TCC slip torque threshold, then the TCC may be fully opened. If the requested TCC torque capacity is not less than an engine pull-up TCC slip torque threshold, no action may be taken. If the requested TCC torque capacity is less than an engine pull-up TCC slip torque threshold, then TCC is fully opened, the ISG is operated in a speed control mode, and the driveline disconnect clutch is closed after the ISG enters speed control mode to rotate the engine. The engine is started by supplying the engine with spark and fuel. Once it is judged that the requested TCC torque capacity is less than an engine pull-up TCC slip torque threshold, the TCC is fully opened and the engine is started unconditionally.

A threshold amount of time since a most recent engine pull-up request is input to block 326 along with the engine pull-up request. Block 326 judges if the threshold amount of time has passed since the most recent engine pull-up request was asserted. If not, no action may be taken. If so, the TCC is fully opened, the ISG is operated in a speed control mode, and the driveline disconnect clutch is closed after the ISG enters speed control mode to rotate the engine.

The engine pull-up request and the indication of TCC slip being present are input to block 314. If both the engine pull-up request is asserted and TCC slip is asserted, block 314 changes the ISG mode from operating in a torque control mode (e.g., ISG torque is commanded to and follows a requested ISG torque while ISG speed is allowed to vary)

to operating in a speed control mode. The selected ISG mode is input to block 318 where the ISG is operated in the selected mode.

At block 316, the engine pull-up request is input to block 316 and the indication of slip being present is input to block 316. If the engine pull-up request is asserted and the slip indication is present, the driveline disconnect clutch is closed and the engine is started after the ISG begins operating in the speed control mode.

Figure 5:
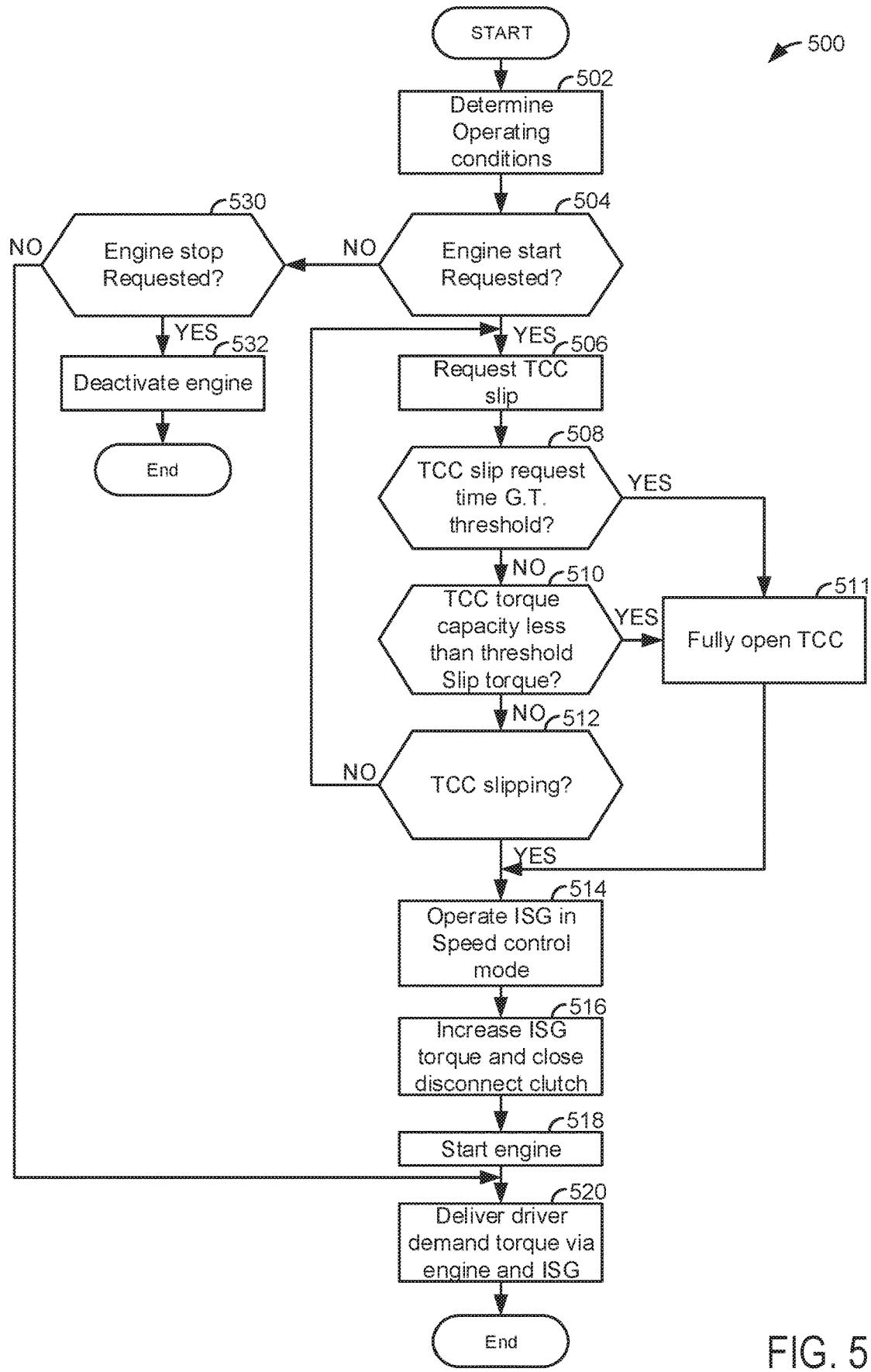
FIG. 5 shows a flow chart of a driveline operating sequence.

Referring now to FIG. 4, a vehicle operating sequence according to the method of FIG. 5 and the controller block diagram of FIG. 3 is shown. The two plots are time aligned and they occur at a same time. The vertical lines at times t1-t6 represents times of interest in the sequence.

The first plot from the top of FIG. 4 is a plot of driver demand torque versus time. The vertical axis represents driver demand torque and driver demand torque increases in the direction of the vertical axis arrow. The horizontal axis of the first plot represents time and time increases from the left side of the figure to the right side of the figure. Trace 402 represents driver demand torque.

The second plot from the top of FIG. 4 is a plot of an engine start request versus time. The vertical axis represents the engine start request state and an engine start is requested when trace 404 is at a higher level near the vertical axis arrow. An engine start request is not asserted when trace 404 is at a lower level near the horizontal axis. The horizontal axis represents time and time increases from the left side of the figure to the right side of the figure. Trace 404 represents driver demand torque.

The third plot from the top of FIG. 4 is a plot of a time since a most recent engine start request versus time. The vertical axis represents the a time since a most recent engine start request and the time since a most recent engine start an engine request increases in the direction of the vertical axis arrow. The horizontal axis represents time and time increases from the left side of the figure to the right side of the figure. Trace 406 represents the amount of time since a most recent engine start. Horizontal line 450 represents a threshold amount of time since a most recent engine pull-up request.

The fourth plot from the top of FIG. 4 is a plot of TCC torque capacity plus TCC margin torque versus time. The vertical axis represents TCC torque capacity plus TCC margin torque and the TCC torque capacity plus TCC margin torque increases in the direction of the vertical axis arrow. The horizontal axis represents time and time increases from the left side of the figure to the right side of the figure. Trace 408 represents the TCC torque capacity. Horizontal line 454 represents TCC stroke margin torque and horizontal line 452 represents an engine pull-up threshold slip torque.

The fifth plot from the top of FIG. 4 is a plot of TCC operating state versus time. The vertical axis represents the TCC operating state and the TCC is fully closed when trace 410 is near the horizontal axis. The TCC is fully open when trace 410 is near the vertical axis arrow. The TCC is slipping when trace 410 is near a middle level of the vertical axis. Trace 410 represents the TCC operating state. The horizontal axis represents time and time increases from the left side of the figure to the right side of the figure.

The sixth plot from the top of FIG. 4 is a plot of engine operating state versus time. The vertical axis represents the engine operating state and the engine is operating (e.g., combusting fuel) when trace 412 is near the vertical axis arrow. The engine is not operating when trace 412 is near the horizontal axis. Trace 412 represents the engine operating state. The horizontal axis represents time and time increases from the left side of the figure to the right side of the figure.

The seventh plot from the top of FIG. 4 is a plot of ISG mode versus time. The vertical axis represents the ISG mode and ISG is operating in a speed control mode when trace 414 is near the vertical axis arrow. The ISG is operating in a torque control mode when trace 414 is near the horizontal axis. Trace 414 represents the ISG operating mode. The horizontal axis represents time and time increases from the left side of the figure to the right side of the figure.

At time t0, the engine is stopped (not rotating) and the driver demand torque is at a lower level. The electric machine (not shown) is providing torque to propel the vehicle and meet the driver demand torque. An engine start request is not asserted and the time since a most recent engine start request is zero since the engine is commanded off. The TCC is fully closed to improve driveline efficiency and the TCC torque capacity plus TCC margin torque is high. The ISG is operating in a torque control mode providing the requested driver demand torque.

At time t1, the driver demand torque has increased to a level where an engine start or pull-up is requested. The time since the most recent engine start request begins to increase and the TCC torque capacity plus TCC margin torque is decreased in response to the engine start request. The TCC is fully closed since TCC slip is not detected. The engine is stopped and the ISG is operating in a torque control mode.

Between time t1 and time t2, the TCC torque capacity plus margin torque remains above threshold 452 and the amount of time since the most recent engine start request exceeds threshold 450 so the TCC is fully opened. The ISG mode is changed from torque control mode to speed control mode in response to the amount of time since the most recent engine start request exceeding threshold 450. The engine is started in response to the ISG entering speed control mode and the amount of time since the most recent engine start request exceeding threshold 450. The TCC is closed and the TCC torque capacity plus margin torque is increased after the engine is started. The ISG switches back to torque control mode after the engine is started so that driver demand torque may be followed.

At time t2, the engine is stopped since driver demand torque has been lowered. The engine start request is not asserted and the time since the most recent engine start request is reset to zero since the engine is stopped. The TCC torque capacity plus the margin torque is at a high level since the TCC is fully closed.

Between time t2 and time t3, the driver demand torque gradually increases and the engine remains stopped. An engine start request is not asserted and the time since the most recent engine start request is zero. The TCC torque capacity plus the TCC margin torque remains at a high level since the TCC is fully closed. The ISG continues to operate in a torque control mode.

At time t3, the driver demand torque has increased to a level where an engine start or pull-up is requested. The time since the most recent engine start request begins to increase and the TCC torque capacity plus TCC margin torque is decreased in response to the engine start request. The TCC is fully closed since TCC slip is not detected. The engine is stopped and the ISG is operating in a torque control mode.

Between time t3 and time t4, the TCC torque capacity plus margin torque remains is reduced to a level below threshold 452 causing the TCC to be fully opened. The amount of time since the most recent engine start request eventually exceeds threshold 450, but the TCC is already fully opened by that time. The ISG mode is changed from torque control mode to speed control mode in response to the TCC torque capacity plus margin torque being reduced to a level below threshold 452. The engine is started in response to the TCC torque capacity plus margin torque remains being reduced to a level below threshold 452. The TCC is closed and the TCC torque capacity plus margin torque is increased after the engine is started. The ISG switches back to torque control mode after the engine is started so that driver demand torque may be followed.

At time t4, the engine is stopped since driver demand torque has been lowered. The engine start request is not asserted and the time since the most recent engine start request is reset to zero since the engine is stopped. The TCC torque capacity plus the margin torque is at a high level since the TCC is fully closed.

Between time t4 and time t5, the driver demand torque gradually increases and the engine remains stopped. An engine start request is not asserted and the time since the most recent engine start request is zero. The TCC torque capacity plus the TCC margin torque remains at a high level since the TCC is fully closed. The ISG continues to operate in a torque control mode.

At time t5, the driver demand torque has increased to a level where an engine start or pull-up is requested. The time since the most recent engine start request begins to increase and the TCC torque capacity plus TCC margin torque is decreased in response to the engine start request. The TCC is fully closed since TCC slip is not detected. The engine is stopped and the ISG is operating in a torque control mode.

Shortly after time t5, TCC slip is indicated after the TCC torque capacity plus TCC margin torque is reduced. The ISG mode is changed from torque control mode to speed control mode in response to TCC slip being indicated and the engine start request being asserted. The engine is started and it begins to generate torque. The TCC is fully closed and the TCC torque capacity plus margin torque is increased after the engine is started. The ISG switches back to torque control mode after the engine is started so that driver demand torque may be followed.

At time t6, the engine is stopped since driver demand torque has been lowered. The engine start request is not asserted and the time since the most recent engine start request is reset to zero since the engine is stopped. The TCC torque capacity plus the margin torque is at a high level since the TCC is fully closed.

Thus, the TCC may be commanded and fully opened even if TCC slip is not indicated after a threshold amount of time has elapsed since a most recent engine start request. In addition, the TCC may be commanded and fully opened even if TCC slip is not indicated after TCC torque capacity plus margin torque is less than an engine pull-up threshold TCC slip torque. However, if TCC slip is detected, TCC slip may be continued to provide improved driveline efficiency.

Referring now to FIG. 5, a flow chart of a method for operating a vehicle driveline is shown. The method of FIG. 5 may be incorporated into and may cooperate with the system of FIGS. 1 and 2. Further, at least portions of the method of FIG. 5 may be incorporated as executable instructions stored in non-transitory memory while other portions of the method may be performed via a controller transforming operating states of devices and actuators in the physical world. The method of FIG. 5 may be executing when a vehicle is traveling on a road after the vehicle has been activated.

At 502, method 500 determines operation conditions. Operating conditions may include but are not limited to driver demand torque, ISG torque, TCC torque capacity, TCC slip, engine operating state, ISG speed, and torque converter turbine speed. Method 500 proceeds to 504.

At 504, method 500 judges if an engine start is requested. An engine start (e.g., rotating the engine and beginning to combust fuel in the engine) may be requested automatically via a controller when the vehicle is traveling on a road and driver demand torque exceeds a threshold driver demand torque. An engine start request may also be made when battery SOC is less than a threshold SOC. Further, an engine start request may be made after the engine has not started within a threshold amount of time since the engine was last stopped or shut off. If method 500 judges that an engine start is requested, the answer is yes and method 500 proceeds to 506. Otherwise, the answer is no and method 500 proceeds to 530.

At 530, method 500 judges if an engine stop is requested. An engine stop (e.g., ceasing engine rotation) may be requested via a controller when the vehicle is traveling on a road and driver demand torque is less than a threshold driver demand torque. An engine stop request may also be made when battery SOC is greater than a threshold SOC. If method 500 judges that an engine stop is requested, the answer is yes and method 500 proceeds to 532. Otherwise, the answer is no and method 500 proceeds to 520.

At 532, method 500 ceases fuel injection to the engine and stops engine rotation. The driveline disconnect clutch may also be fully opened when the engine is stopped so that the vehicle may continue to travel without rotating the engine. Method 500 proceeds to exit.

At 506, method 500 requests TCC slip. A specific amount of TCC slip may be requested (e.g., 200 RPM). The TCC slip is requested so that the ISG may enter speed control mode so that ISG speed may be controlled without having to complete with the control of the TCC. This may allow the vehicle speed to be maintained at a constant level while the engine is started. Requesting TCC slip may include requesting to reduce torque capacity of the TCC to less than a threshold torque capacity. Method 500 proceeds to 506 after TCC slip is requested.

At 508, method 500 judges if a threshold amount of time has lapsed or passed since a most recent engine stop is requested. The amount of lapsed time may be counted via the controller and stored in controller memory. If method 500 judges that a threshold amount of time has lapsed or passed since a most recent engine stop is requested, then the answer is yes and method 500 proceeds to 511. Otherwise, the answer is no and method 500 proceeds to 510. The TCC may be fully opened when the threshold amount of time has lapsed or passed since a most recent engine stop is requested when TCC slip is not present.

At 510, method 500 judges if a requested TCC torque capacity is less than an engine pull-up TCC slip torque threshold. If method 500 judges that the requested TCC torque capacity is less than an engine pull-up TCC slip torque threshold, then the answer is yes and method 500 proceeds to 511. Otherwise, the answer is no and method 500 proceeds to 512. The TCC may be fully opened when the requested TCC torque capacity is less than an engine pull-up TCC slip torque threshold when TCC slip is not present.

At 511, method 500 fully opens the TCC. The TCC is fully opened so that driveline noise and vibration may be lessened when the engine is started via the ISG and closing the driveline disconnect clutch. Method 500 proceeds to 514.

At 512, method 500 judges if the TCC is slipping. Method 500 may judge that the TCC is slipping when a rotational speed of an input side of the TCC minus a rotational speed of an output side of the TCC is greater than a threshold. If method 500 judges that the TCC is slipping, the answer is yes and method 500 proceeds to 514. Otherwise, the answer is no and method 500 returns to 506.

At 514, method 500 operates the ISG in a speed control mode. The ISG may be transitioned from operating in a torque control mode into the speed control mode. Method 500 proceeds to 516.

At 516, method 500 closes the driveline disconnect clutch and begins to rotate the engine via the ISG. The ISG torque output may be increased to maintain the ISG speed at the requested ISG speed. Method 500 proceeds to 518.

At 518, method 500 starts the engine via supplying fuel and spark to the engine. An engine start request may be generated to start the engine. Method 500 proceeds to 520.

At 520, method 500 delivers a requested driver demand torque solely via the engine, via the engine and the ISG, or solely via the ISG. In one example, the driver demand torque may be portioned into a first portion that is generated by the engine and a second portion that is generated via the ISG. The portioning may be determined according to vehicle parameters including but not limited to the level of the driver demand torque, battery SOC, and engine temperature. Additionally, the TCC may be fully closed after the engine is started to improve driveline efficiency. Method 500 proceeds to exit.

In this way, the torque converter clutch may be fully opened when the TCC is not slipping after TCC slip has been requested. If torque converter slip is indicated, then the TCC may continue to slip and the engine may be started while the TCC is slipping so that driveline efficiency may be maintained.

Thus, the method of FIG. 5 provides for a driveline operating method, comprising: requesting an engine start; and requesting slip of a torque converter clutch in response to the request to start the engine; and fully opening a torque converter clutch via a controller after a threshold amount of time has passed since the requesting slip of the torque converter clutch when slip of the torque converter clutch is not present. The method further comprises closing a driveline disconnect clutch and increasing torque output of an integrated starter/generator after fully opening the torque converter clutch. The method further comprises detecting slip of the torque converter clutch and changing an operating mode of an integrated starter/generator from a torque control mode to a speed control mode in response to detecting slip of the torque converter clutch. The method further comprises closing a driveline disconnect clutch and starting an engine in response to the integrated starter/generator entering the speed control mode. The method further comprises propelling a vehicle via an integrated starter/generator with a fully locked torque converter clutch at a time of requesting the engine start. The method includes where the engine start is requested automatically via the controller. The method further comprises detecting the presence or absence of slip of the torque converter clutch via torque converter turbine speed and speed of an integrated starter/generator.

The method of FIG. 5 also provides for a driveline operating method, comprising: requesting an engine start; and requesting slip of a torque converter clutch in response to the request to start the engine; and fully opening a torque converter clutch via a controller after a commanded torque converter clutch torque capacity is reduced to less than a threshold torque capacity after requesting slip of the torque converter clutch when slip of the torque converter clutch is not present. The method further comprises closing a driv-
eline disconnect clutch and increasing torque output of an integrated starter/generator after fully opening the torque converter clutch. The method further comprises detecting slip of the torque converter clutch and changing an operating mode of an integrated starter/generator from a torque control mode to a speed control mode in response to detecting slip of the torque converter clutch.

The method of FIG. 5 also further comprising closing a driveline disconnect clutch and starting an engine in response to the integrated starter/generator entering the speed control mode. The method further comprises propelling a vehicle via an integrated starter/generator with a fully locked torque converter clutch at a time of requesting the engine start. The method further comprises reducing a torque converter clutch torque capacity in response to the request to slip the torque converter clutch. The method further comprises starting an engine in response to fully opening the torque converter clutch.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, at least a portion of the described actions, operations and/or functions may graphically represent code to be programmed into non-transitory memory of the computer readable storage medium in the control system. The control actions may also transform the operating state of one or more sensors or actuators in the physical world when the described actions are carried out by executing the instructions in a system including the various engine hardware components in combination with one or more controllers.

This concludes the description. The reading of it by those skilled in the art would bring to mind many alterations and modifications without departing from the spirit and the scope of the description. For example, single cylinder, I3, I4, I5, V6, V8, V10, and V12 engines operating in natural gas, gasoline, diesel, or alternative fuel configurations could use the present description to advantage.

The invention claimed is:
1. A driveline operating method, comprising:
  requesting an engine start; and
  requesting slip of a torque converter clutch in response to the request to start the engine; and
  fully opening the torque converter clutch via a controller after a threshold amount of time has passed since the requesting slip of the torque converter clutch when slip of the torque converter clutch is not present.
2. The method of claim 1, further comprising closing a driveline disconnect clutch and increasing torque output of an integrated starter/generator after fully opening the torque converter clutch.

3. The method of claim 1, further comprising detecting slip of the torque converter clutch and changing an operating mode of an integrated starter/generator from a torque control mode to a speed control mode in response to detecting slip of the torque converter clutch.

4. The method of claim 3, further comprising closing a driveline disconnect clutch and starting an engine in response to the integrated starter/generator entering the speed control mode.

5. The method of claim 1, further comprising propelling a vehicle via an integrated starter/generator with a fully locked torque converter clutch at a time of requesting the engine start.

6. The method of claim 1, where the engine start is requested automatically via the controller.

7. The method of claim 1, further comprising detecting the presence or absence of slip of the torque converter clutch via torque converter turbine speed and speed of an integrated starter/generator.

8. A driveline operating method, comprising:
requesting an engine start; and
requesting slip of a torque converter clutch in response to the request to start the engine; and
fully opening the torque converter clutch via a controller after a commanded torque converter clutch torque capacity is reduced to less than a threshold torque capacity after requesting slip of the torque converter clutch when slip of the torque converter clutch is not present.

9. The method of claim 8, further comprising closing a driveline disconnect clutch and increasing torque output of an integrated starter/generator after fully opening the torque converter clutch.

10. The method of claim 8, further comprising detecting slip of the torque converter clutch and changing an operating mode of an integrated starter/generator from a torque control mode to a speed control mode in response to detecting slip of the torque converter clutch.

11. The method of claim 10, further comprising closing a driveline disconnect clutch and starting an engine in response to the integrated starter/generator entering the speed control mode.

12. The method of claim 8, further comprising propelling a vehicle via an integrated starter/generator with a fully locked torque converter clutch at a time of requesting the engine start.

13. The method of claim 8, further comprising reducing a torque converter clutch torque capacity in response to the request to slip the torque converter clutch.

14. The method of claim 8, further comprising starting an engine in response to fully opening the torque converter clutch.

15. A system, comprising:
an engine;
an electric machine;
a driveline disconnect clutch;
a torque converter including a torque converter clutch; and
a controller including executable instructions stored in non-transitory memory to fully open the torque converter clutch, rotate the engine via torque provided via the electric machine, and closing the driveline disconnect clutch in response to a threshold amount of time having passed since requesting slip of the torque converter clutch in response to an engine start request when slip of the torque converter clutch is not present.

16. The system of claim 15, further comprising additional instructions to fully open the torque converter clutch via the controller after commanding torque converter clutch torque capacity to be reduced to less than a threshold torque capacity after requesting slip of the torque converter clutch when slip of the torque converter clutch is not present.

17. The system of claim 15, further comprising additional instructions to detect slip of the torque converter clutch and change an operating mode of the electric machine from a torque control mode to a speed control mode in response to detecting slip of the torque converter clutch.

18. The system of claim 15, where the electric machine is an integrated starter/generator.

19. The system of claim 15, where the torque converter clutch is opened unconditionally after the threshold amount of time has passed.

20. The system of claim 15, further comprising additional instructions to start the engine in response to fully opening the torque converter clutch.

* * * * *